(12) United States Patent
Landi et al.

(10) Patent No.: US 11,098,726 B2
(45) Date of Patent: Aug. 24, 2021

(54) MODULAR COMPRESSOR WITH GAS BEARINGS AND SYSTEM FOR RAISING THE PRESSURE IN PRODUCTION GAS

(71) Applicant: VETCO GRAY SCANDINAVIA AS, Sandvika (NO)

(72) Inventors: Giacomo Landi, Oslo (NO); Lorenzo Bergamini, Bari (IT); Dante Tommaso Rubino, Florence (IT); Erik Mele, Sandvika (NO); Michael Catanzaro, Florence (IT)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 0 days.

(21) Appl. No.: 16/306,072

(22) PCT Filed: May 25, 2017

(86) PCT No.: PCT/EP2017/062702
§ 371 (c)(1),
(2) Date: Nov. 30, 2018

(87) PCT Pub. No.: WO2017/207411
PCT Pub. Date: Dec. 7, 2017

(65) Prior Publication Data
US 2019/0136862 A1 May 9, 2019

(30) Foreign Application Priority Data
Jun. 3, 2016 (NO) .................................... 20160954

(51) Int. Cl.
*F04D 29/041* (2006.01)
*F16C 37/00* (2006.01)
(Continued)

(52) U.S. Cl.
CPC ......... *F04D 29/0413* (2013.01); *F01D 25/22* (2013.01); *F04D 17/122* (2013.01);
(Continued)

(58) Field of Classification Search
CPC ........ F01D 25/22; F01D 15/00; F01D 25/166; F04D 29/0413; F04D 29/582;
(Continued)

(56) References Cited

U.S. PATENT DOCUMENTS 3,584,973 A * 6/1971 Lambiris ................. F01D 11/06
417/13
4,311,004 A * 1/1982 du Pont ................. F04D 29/104
415/175

(Continued)

FOREIGN PATENT DOCUMENTS

DE 3729486 C1 12/1988
EP 1205678 A1 5/2002
(Continued)

OTHER PUBLICATIONS

PCT Search Report and Written Opinion issued in connection with corresponding Application No. PCT/EP2017/062702 dated Aug. 28, 2017.
(Continued)

*Primary Examiner* — Ninh H. Nguyen
*Assistant Examiner* — Brian Christopher Delrue
(74) *Attorney, Agent, or Firm* — Baker Hughes Patent Organization

(57) ABSTRACT

A system and modular compressor for raising the pressure in production gas is disclosed, wherein in a set of compressor modules each second module is a rotor module carrying an impeller driven in rotation relative to an adjacent stationary module, a rotor module and a stationary module in combination providing a compressor stage in which production gas
(Continued)

is accelerated through a flow duct that passes an interface between the rotor module and the stationary module, wherein at the interface at least one bearing for axial and/or radial load is provided for journaling the rotor module on the stationary module. The at least one bearing is a gas bearing, wherein a passage is arranged in the stationary module to lead an extracted portion of production gas at raised pressure from the compressor to the gas bearing(s).

19 Claims, 5 Drawing Sheets

(51) Int. Cl.
    *F04D 29/28*     (2006.01)
    *F04D 17/12*     (2006.01)
    *F04D 25/06*     (2006.01)
    *F04D 29/051*     (2006.01)
    *F01D 25/22*     (2006.01)

(52) U.S. Cl.
    CPC ....... *F04D 25/0606* (2013.01); *F04D 25/066* (2013.01); *F04D 29/0513* (2013.01); *F04D 29/286* (2013.01); *F16C 37/005* (2013.01)

(58) Field of Classification Search
    CPC .... F04D 29/122; F04D 29/584; F04D 29/083; F04D 29/058; F04D 17/12; F04D 19/02; F04D 25/04; F04D 25/06; F16C 32/06; F16C 32/0402; F16C 13/026; F16C 32/0614; F05D 2240/51
    See application file for complete search history.

(56) References Cited

U.S. PATENT DOCUMENTS

| | | | | |
|---|---|---|---|---|
| 5,312,225 A * | 5/1994 | Lorenzen | ............. | F04D 29/058 415/105 |
| 5,547,350 A * | 8/1996 | Rawal | ............. | F04D 25/0606 417/354 |
| 6,043,580 A * | 3/2000 | Vogel | ............. | F04D 25/0606 310/179 |
| 6,153,959 A * | 11/2000 | Lorenzo | ............. | H02K 1/06 310/112 |
| 6,231,302 B1 * | 5/2001 | Bonardi | ............. | F01D 25/22 415/105 |
| 8,083,413 B2 * | 12/2011 | Ertas | ............. | F16C 17/035 384/117 |
| 8,446,060 B1 * | 5/2013 | Lugg | ............. | H02K 21/024 310/156.22 |
| 9,121,448 B2 * | 9/2015 | Delgado Marquez | ............. | F01D 25/166 |
| 9,879,691 B2 * | 1/2018 | Mizukami | ............. | F04D 3/00 |
| 2005/0032469 A1 * | 2/2005 | Duescher | ............. | B24D 11/001 451/548 |
| 2007/0110596 A1 * | 5/2007 | Weeber | ............. | F04D 29/058 417/370 |
| 2007/0212238 A1 * | 9/2007 | Jacobsen | ............. | F04D 29/058 417/423.1 |
| 2007/0269323 A1 * | 11/2007 | Zhou | ............. | F04D 29/584 417/423.7 |
| 2008/0115527 A1 * | 5/2008 | Doty | ............. | F04D 29/058 62/498 |
| 2011/0008186 A1 * | 1/2011 | Palomba | ............. | F04D 17/122 417/247 |
| 2012/0107143 A1 * | 5/2012 | Gilarranz | ............. | F04D 29/104 417/53 |
| 2012/0306206 A1 * | 12/2012 | Agrawal | ............. | F01D 15/10 290/52 |
| 2013/0091869 A1 * | 4/2013 | Bardon | ............. | F25J 1/0279 62/6 |
| 2013/0136629 A1 * | 5/2013 | Maier | ............. | F04D 29/584 417/366 |
| 2013/0195609 A1 * | 8/2013 | Mariotti | ............. | F04D 17/122 415/1 |
| 2013/0294939 A1 * | 11/2013 | Gilarranz | ............. | F04D 25/0606 417/53 |
| 2014/0020393 A1 * | 1/2014 | Nakamata | ............. | F23R 3/06 60/754 |
| 2014/0301865 A1 * | 10/2014 | Lull | ............. | F04B 27/0423 417/53 |
| 2015/0064026 A1 * | 3/2015 | Maier | ............. | F04D 25/0606 417/53 |
| 2016/0090991 A1 * | 3/2016 | Devitt | ............. | F16J 15/3404 416/174 |
| 2016/0186570 A1 * | 6/2016 | Lugg | ............. | F01D 5/34 416/3 |
| 2016/0290345 A1 * | 10/2016 | Palomba | ............. | F04D 29/051 |
| 2020/0173495 A1 * | 6/2020 | Peterson | ............. | F16C 33/26 |

FOREIGN PATENT DOCUMENTS

| | | | | |
|---|---|---|---|---|
| EP | 2022950 A1 * | 2/2009 | ............. | F01D 25/16 |
| EP | 2469100 A1 | 6/2012 | | |
| JP | 2003293987 A | 10/2003 | | |
| WO | 96018818 A1 | 6/1996 | | |
| WO | 2004094833 A1 | 11/2004 | | |
| WO | 2011080047 A2 | 7/2011 | | |

OTHER PUBLICATIONS

NO Office Action and NO Search Report issued in connection with corresponding Application No. NO 20160954 dated Dec. 20, 2016.

* cited by examiner

MODULAR COMPRESSOR WITH GAS BEARINGS AND SYSTEM FOR RAISING THE PRESSURE IN PRODUCTION GAS

TECHNICAL FIELD

Embodiments of the present invention relate to a system and a compressor of modular, stackable design operable for raising the pressure in production gas. To be more specific, embodiments of the subject invention concern a modular compressor, wherein in a set of compressor modules each second module is a rotor module carrying an impeller driven in rotation relative to an adjacent stationary module, a rotor module and a stationary module in combination providing a compressor stage in which production gas is accelerated through a duct that passes an interface between the rotor module and the stationary module, wherein at said interface at least one bearing for taking up axial and/or radial load is provided to journal the rotor module on the stationary module.

A modular compressor of this general structure is previously known from U.S. Pat. No. 5,547,350 A.

BACKGROUND OF THE INVENTION

In natural gas production, whether at land or subsea, high power output compressors can be used for raising the pressure of the production gas to aid in transport over long distances or if well pressure is insufficient for lifting the gas to the surface, e.g. Centrifugal compressors of multistage configuration are suitable for generation of appropriate gas pressures ranging from about 100 bar. A conventional multistage centrifugal compressor typically includes a rotor with a rotor shaft that supports a number of rotor blades at each stage of the compressor, as well as sealing assemblies, couplings and other elements associated with the rotor. The rotor thus constitutes a mass that produces considerable static axial forces and dynamic radial forces when the rotor is driven in rotation at speeds in the order of, for instance, 5,000 to 25,000 rpm. Journaling the rotor for a vibration-free operation requires thrust bearings and radial bearings which can sustain these static and dynamic loads.

Oil lubricated contact bearings may be used for supporting and journaling the compressor rotor. However the use of conventional tilting pad bearings requires the separation between the bearing cavity and the process to ensure the correct hydrodynamic lubrication of the bearing and prevent contaminations of the lubricating media that would have an impact on its lubrication-cooling property.

In applications where it is desired to avoid oil, such as in the subsea environment e.g., contact-free active or passive magnetic bearings may instead be used. Active magnetic bearing systems are however complex and comparatively costly and requires electronic equipment, sensors and power controls for constant monitoring and power regulation. Passive magnetic bearings on the other hand are essentially not available for high power compressor applications due to the strong magnetic fields that are required for journaling heavy rotor masses, which makes assembly most complicated and costly.

Another alternative for journaling the rotor of a compressor or other turbomachine includes the use of gas bearings. Gas bearings are operated on a supply of air or other gas which is supplied to create a film of gas at the interface between the pad and a revolving surface of the rotor. Unmodified, traditional gas bearings however are commonly known to have limited capacity for accommodation of rotor assemblies of larger masses, such as those used in high power output machines like the gas or wet gas compressors used in natural gas production.

U.S. Pat. No. 9,121,448 B2 discloses a combination of a sealed damper assembly and a hybrid gas tilting pad journal bearing to compensate for limited static load and poor damping capability of the gas bearing. The bearing concept is further disclosed in U.S. Pat. No. 8,083,413 B2.

SUMMARY OF THE INVENTION

It is an object of the present invention to provide a compressor and a system adapted for use of gas bearings to accommodate the compressor rotor.

This object is met in a compressor for raising the pressure in production gas as initially stated, wherein the at least one bearing is a gas bearing, and wherein a passage is arranged in the stationary module to lead an extracted portion of production gas at raised pressure from the compressor to the gas bearing(s).

Splitting the rotor into separate rotor modules results in a corresponding reduction of rotor mass, making possible the use of non-complex gas bearings of traditional design for suspension of the rotor modules in the compressor. Of course, embodiments of the invention do not exclude use of more complex bearing designs.

Feeding the gas bearings with production gas taken from the compressor is a solution that requires minimum of structural measures for securing access and supply of feed gas to the bearings.

In one embodiment, a gas feed passage is arranged in the stationary module feeding production gas to the gas bearing(s) from an internal gas tap in the diffusor section of the compressor flow duct.

In one embodiment the compressor is a shaft-less compressor, and a gas feed passage is arranged in the stationary module feeding production gas to the gas bearing(s) from an internal infeed port opening towards a hollow centre of the compressor.

In yet one embodiment a gas feed passage is arranged in the stationary module feeding production gas to the gas bearing(s) from an external infeed port on the exterior of the stationary module.

All the above embodiments benefit from short gas passageways that can be achieved simply through a drilling operation.

In the last two embodiments the internal and/or the external infeed ports may be arranged in flow communication with the production gas discharge from the compressor. This solution provides several advantages of which one is the possibility to regulate the feed of gas to the bearings, another advantage is the possibility to avoid structural modification of the production gas duct through the stationary module, and yet another advantage is that access to feed gas at highest possible pressure is in this way available at the downstream end of the compressor.

In one embodiment a gas tap line is connected to the compressor discharge and arranged with a valve for extraction of production gas which is supplied to the external and/or internal infeed port(s) via an accumulator and/or a separator.

A structurally simple and reliable design includes a manifold pipe arranged for distribution of production gas from the accumulator/separator to the infeed ports of the stationary modules.

The embodiment provides the advantage of feeding dry gas to the gas bearings by separation of the gas and liquid phases and removal of the liquid phase.

The supply gas passes the gas bearing(s) into an interface between the rotor and stationary modules, and wherein said interface between rotating parts is isolated from the production gas duct and the outer environment by means of labyrinth seals.

At least one bearing which is not a gas bearing may be arranged between a rotor module and the adjacent stationary module. The non-gas bearing is arranged for supporting the rotor in transient modes at start-up or shut down, when gas pressure is insufficient for operation of the gas bearings. At least one non-gas bearing may be arranged for taking up axial or thrust load, and at least non-gas bearing may be arranged for taking up radial load.

The non-gas thrust or radial bearing is a contact bearing, and in one embodiment a contact bearing comprising, but not limited to, polycrystalline diamond (PCD) pads. PCD bearings may be favoured due to the advantage of long service life with a minimum request for maintenance.

A passage for supplying lubricant and/or cooling fluid to the non-gas bearing is advantageously arranged in the stationary module. This passage for lubricant/cooling fluid may be supplied from external lubricant/cooling fluid source via a hollow, shaft-less centre of the compressor and/or via inlet/outlet stationary blades.

The rotor module comprises a ring motor including a permanent magnet rotor and an electromagnet stator. One advantage of using a ring motor is that moving motor parts can be avoided, thus avoiding measures for journaling and lubrication of moving parts that would be subject to wear.

In one embodiment the rotor magnet is supported on the compressor rotor module whereas the stator magnet is secured between adjacent stationary modules, in concentric relation with the rotor magnet. One advantage of this embodiment is that sliding contacts for the power supply can be avoided.

Each rotor module is individually powered and controlled, via separate variable speed drives. Every other rotor module in the set of compressor modules may be driven in the opposite direction of rotation relative to the previous or adjacent one. One advantage with this embodiment is that the return flow duct in the stationary module can be designed simpler since the flow that is given a radial, rotational component by the impeller of an upstream rotor is re-straightened by the contra-rotating impeller of a downstream rotor. For example, the return flow duct in the stationary module may be arranged in complete absence of flow directing guides, or with blades that extend only partially through the return flow duct.

The object of the present invention is further met in a system for raising the pressure in production gas, the system comprising a modular compressor wherein a rotating compressor module is journaled in gas bearings on a stationary compressor module. A central feature of the system is that production gas at raised pressure is extracted from the compressor and supplied for operation of the gas bearings.

In one embodiment the system comprises a gas tap line connected to the compressor discharge; an accumulator and/or separator arranged to receive production gas extracted from the compressor discharge via the gas tap line, and a manifold pipe arranged to supply production gas from the accumulator/separator to gas bearing(s) in the stationary compressor modules. Alternatively, or in addition to the manifold pipe, a distributor pipe may be located in a shaft-less, hollow centre of the modular compressor.

BRIEF DESCRIPTION OF THE DRAWINGS

Embodiments of the invention will be explained in more detail below with references made to the accompanying drawings. In the drawings

DETAILED DESCRIPTION

Figure 1:
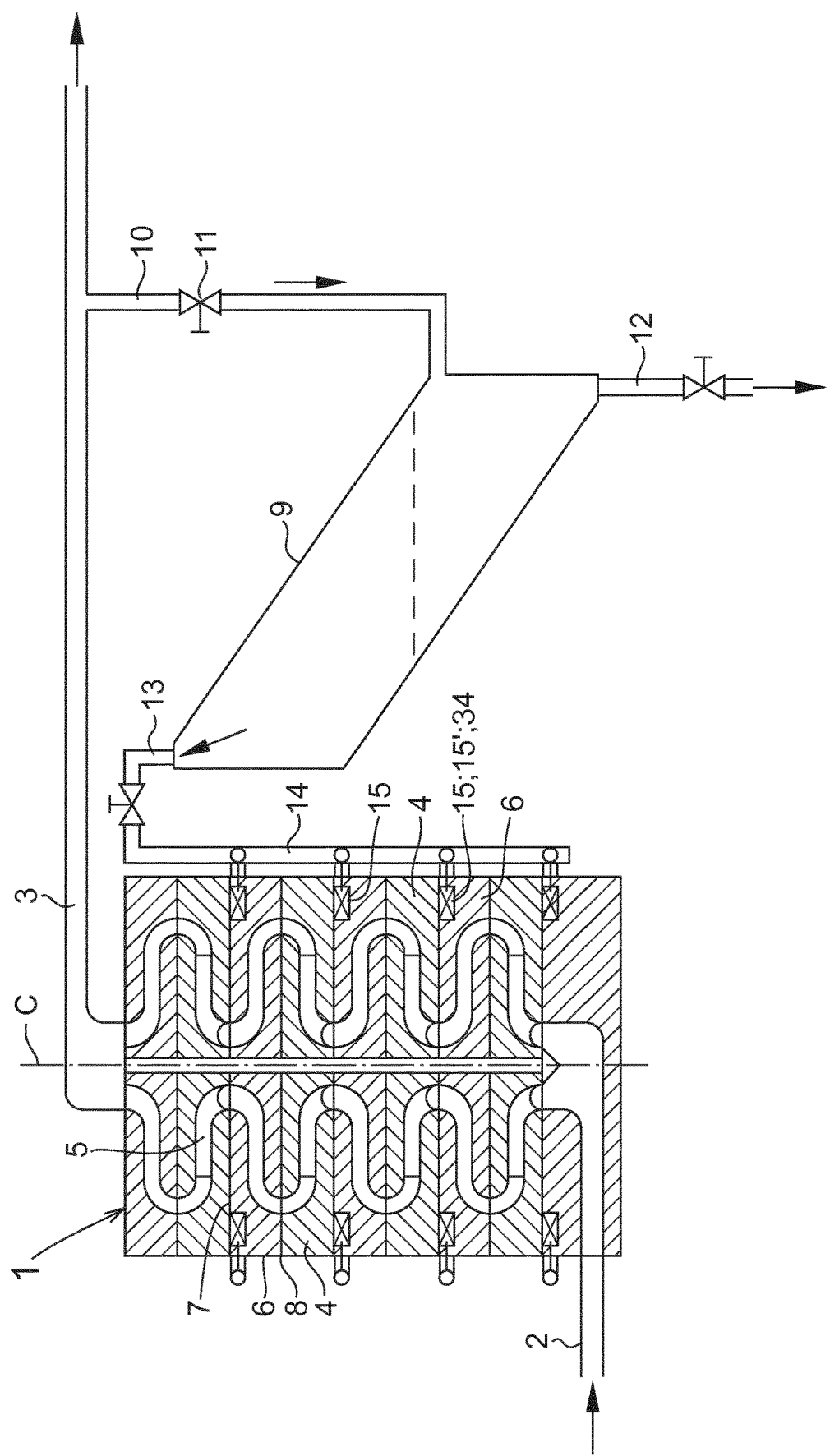
FIG. 1 is a partially sectioned schematic view showing the general setup in an embodiment.
Figure 2:
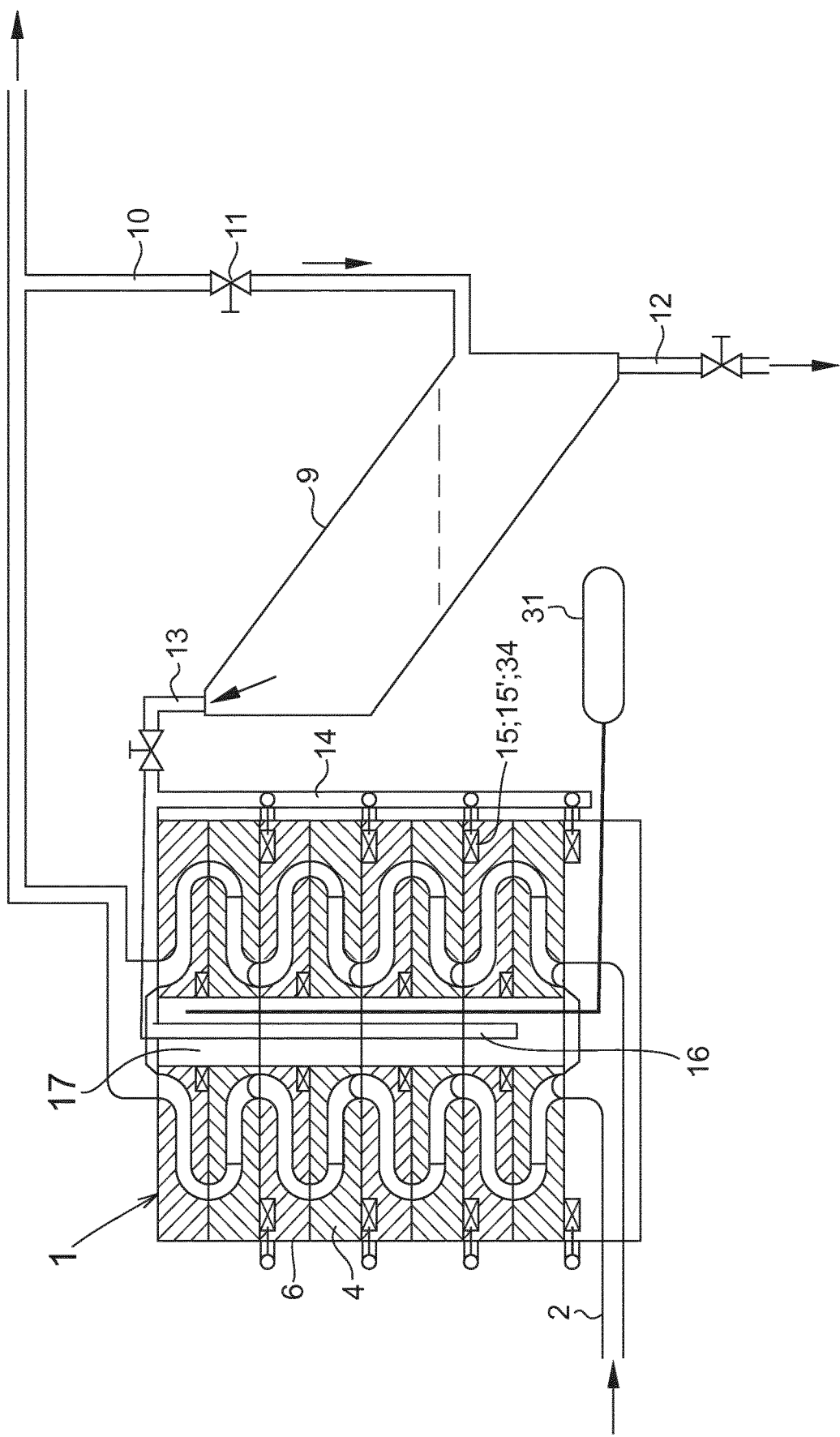
FIG. 2 is a corresponding view to FIG. 1 showing the general setup in an embodiment.

With reference to FIGS. 1 and 2, the components of a system for raising the pressure in production gas comprises a compressor 1 with a compressor inlet 2 and a compressor discharge 3. The compressor 1 is of modular design comprising rotating compressor modules 4 and stationary compressor modules 5 arranged in a stacked configuration. To be more specific, in a set of compressor modules each second module is a rotor module 4 carrying an impeller 5 and driven in rotation relative to an adjacent stationary module 6, a rotor module and a stationary module in combination providing a compressor stage in which production gas is accelerated through a flow duct 7 that passes an interface 8 between the rotor module and the stationary module.

An accumulator 9 is arranged to receive and hold a portion of production gas at raised pressure, which can be extracted from the compressor discharge 3 via a gas tap line 10. A valve 11 can be arranged on the gas tap line to regulate the amount of gas to be extracted. A drain pipe 12 is arranged on the accumulator for discharge of liquid that may have precipitated on the inside walls of the accumulator. In that sense the accumulator 9 may also be seen as a separator which is effective for separation of phases in the production gas.

A gas outlet 13 on the accumulator 9 is connected to a manifold pipe 14 which is arranged for supply of production gas to the compressor. More precisely, the manifold 14 is arranged for distribution of production gas, extracted from the compressor discharge, to radial gas bearings 15 and thrust gas bearings 15' arranged at the interfaces 8 between the rotating and stationary modules 4,6.

FIG. 2 illustrates a modified embodiment wherein a distributor pipe 16 is arranged, instead of or in addition to the manifold pipe 14, for supply of production gas via a hollow centre 17 of a shaft-less compressor 1.

As will be explained in further detail below, the gas for operation of the gas bearings is supplied via feed passages that are formed in the stationary modules 6 of the modular compressor.

Figure 3:
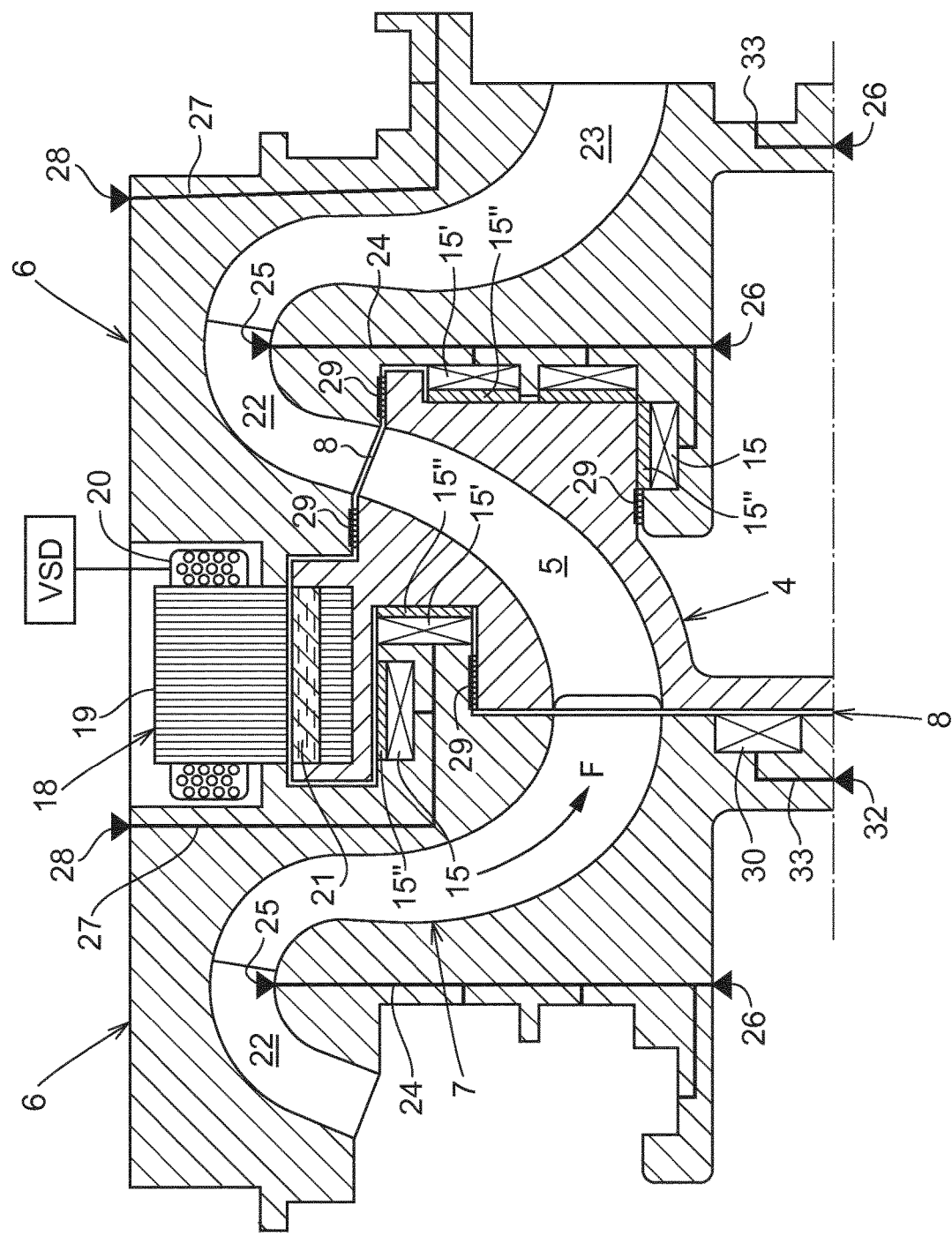
FIG. 3 is a sectioned, cut out detail of a modular, stackable compressor arranged in accordance with several embodiments.

With reference to FIG. 3, a cut out detail of the modular and stackable compressor 1 is shown on a larger scale. More precisely, FIG. 3 shows the sectional views of a rotor module 4 arranged between two stationary modules 6 included in the left hand compressor half in the drawings of FIGS. 1 and 2. In this connection it should be pointed out that the illustrated compressor 1 can be modified for operation in either horizontal or vertical orientation.

The modular compressor 1 is a multistage centrifugal compressor wherein each stage comprises a rotor module 4 and a stationary module 6. The rotor module 4 is driven in rotation by means of a ring motor comprising an electromagnet stator 18 including an iron core 19 and stator windings 20. The stator 18 is stationary housed between two stationary compressor modules 6 and fixated in concentric relation about the rotor module 4. Permanent magnets 21 are supported in the periphery of the rotor module, the magnets 21 causing the rotor module 4 to rotate about a rotor centre C (see FIG. 1) as the magnets 21 are subjected to an alternating magnetic field which is generated as alternating current is fed to the stator windings 20. The rotational speed and direction of rotation can be individually controlled for each rotary module 4 by means of separate, dedicated variable speed drives (VSD).

The rotor module 4 carries an impeller 5 arranged in a flow duct section of radial-axial extension through the rotor module 4. More precisely, the impeller 5 comprises a set of curved impeller blades arranged in a ring about the rotor centre C. The impeller 5 accelerates the production gas through the flow duct in flow direction F, towards a diffusor section 22 and return channel 23 in a flow duct section of radial-axial extension formed through the adjacent downstream stationary compressor module 6.

In transition from the rotary module to the stationary module, the gas flow crosses the interface 8 between the compressor modules. The interface 8 is a gap of sufficient width to accommodate for rotor movements caused by unavoidable variations in the radial load and thrust load applied to the rotor module from the production gas. The changing axial and radial loads acting on the rotor are essentially absorbed in radial bearings and thrust bearings arranged at the interface between the compressor modules. In embodiments of the present invention the bearings are realized in the form of gas bearings 15 or 15', each including tilting bearing pads 15". The radial and thrust gas bearings 15 and 15' are seated in the stationary modules 6.

The gas bearings 15, 15' can be of traditional design as those known by persons skilled in the art. For proper operation they require air/gas of sufficient pressure to create a film and cushion of gas between a gas permeable pad in the bearing and a counter surface on a rotating member that is supported by the bearing.

In embodiments of the present invention, gas for producing the gas film is extracted from the production gas flow and supplied to the bearings via feed passages arranged through the stationary modules 6.

More precisely, in one embodiment, a feed passage 24 is arranged to feed an extracted portion of production gas to the gas bearings 15, 15' from an internal gas tap 25 arranged in the diffusor section 22 of the flow duct 7. The internal gas tap 25 may be located at the downstream end of the diffusor section (where pressure recovery is maximized), or at any other position in the duct through the stationary module depending on the gas bearing's pressure needs.

In another embodiment the feed passage 24 may be arranged to receive production gas from an internal infeed port 26 that is available for supply of gas from the compressor discharge, via a hollow centre of a shaft-less compressor.

In yet an embodiment a gas feed passage 27 is arranged in the stationary module for feeding production gas to gas bearings from an external infeed port 28 which is available on the exterior of the stationary module for supply of gas from the compressor discharge, via the manifold pipe 14.

Still another embodiment foresees supply of production gas to gas bearings via passages machined in the inlet or outlet stator guide vanes which extend through the duct passage in the stationary module.

It will be understood that these embodiments can all be used in different combinations.

The gas bearings 15, 15' are arranged within a length of the interface 8 between the rotary and stationary modules which can be isolated from the external environment by means of labyrinth seals 29, which can be radial and/or axial.

In the embodiment illustrated in FIG. 3, non-gas bearings 30 may be installed as landing or back-up bearings and active for suspending the rotor module 4 in transient modes when gas supply to the gas bearings is insufficient for their proper operation. The non-gas bearing 30 is a contact bearing which can be supplied with lubricant and/or cooling fluid from a lubricant fluid supply 31, as indicated schematically in FIG. 2. The lubricant fluid may advantageously also be production gas that is supplied to infeed ports 32 to a lubricant fluid passage 33 in the stationary module, via the hollow centre of a shaft-less compressor as illustrated in FIGS. 2 and 3. The lubricant may alternatively be glycol.

Figure 4:
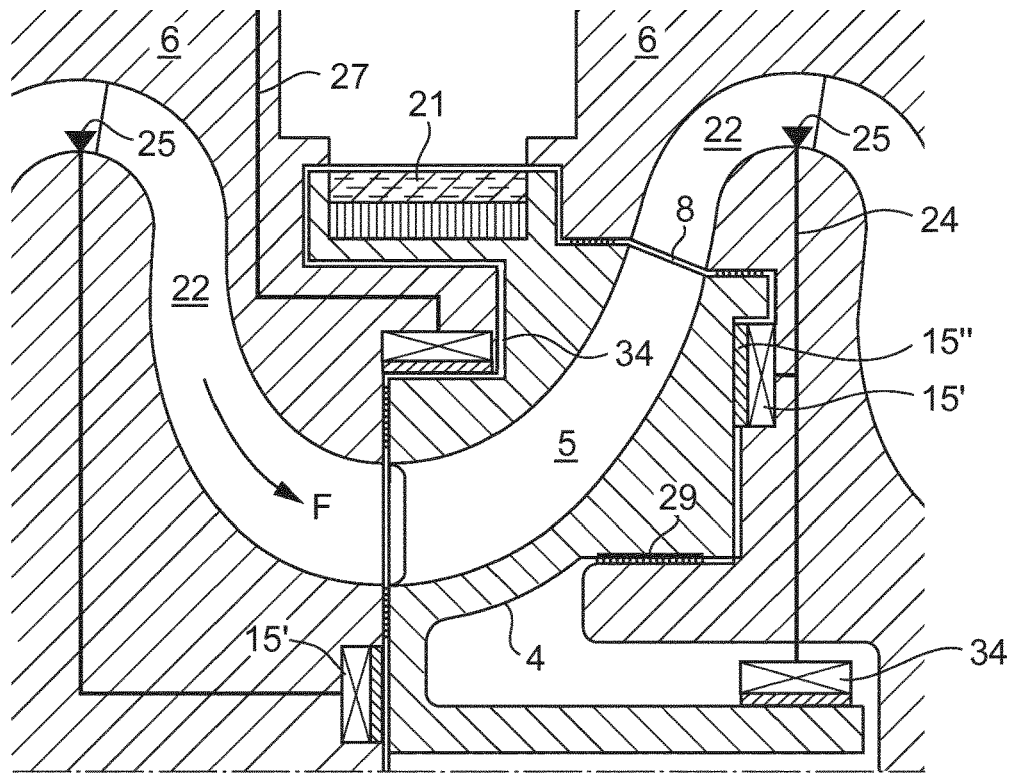
FIGS. 4 and 5 are sectioned views corresponding to FIG. 3, showing alternative embodiments of the modular, stackable compressor with gas bearings.
Figure 5:
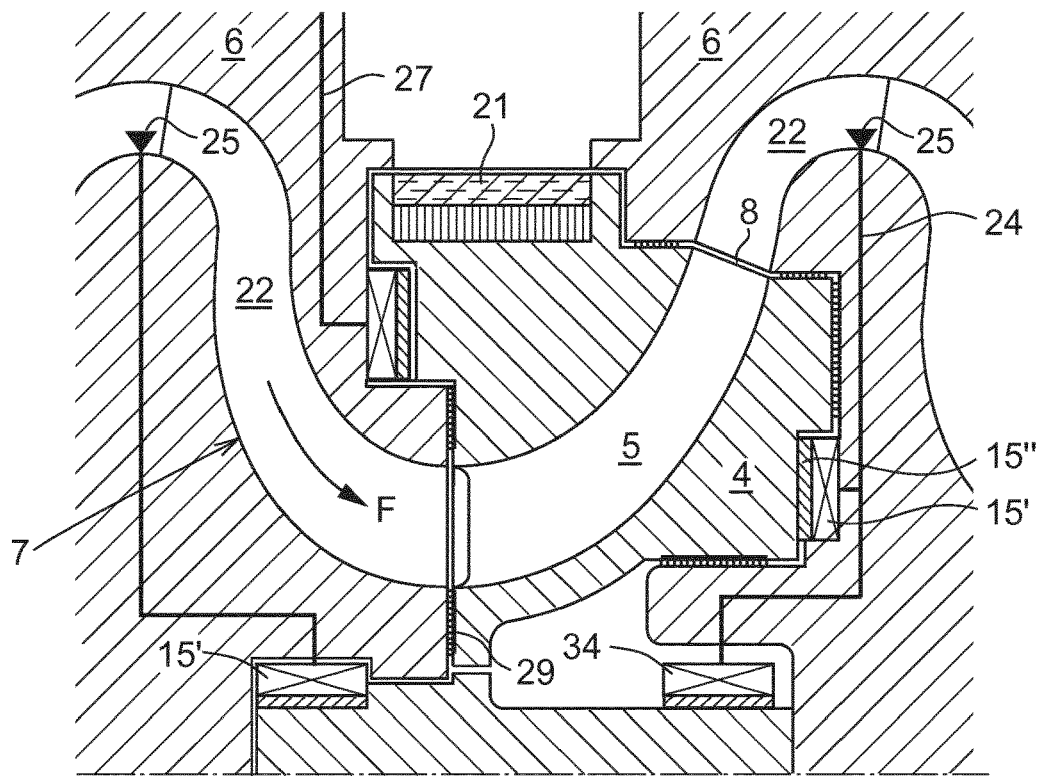

Alternatives to the previous embodiment are illustrated in FIGS. 4 and 5, where like elements are identified by the same reference numbers. A difference between the embodiment of FIG. 3 and the embodiments of FIGS. 4 and 5 is that where the previous embodiment comprises convex radial bearings 15, having bearing pads facing outwards towards the periphery of the compressor, the latter embodiments comprise concave radial bearings 34, i.e. with bearings pads facing inwards towards the centre of the compressor.

Although not illustrated in the embodiments of FIGS. 4 and 5 it will be understood that back-up bearings may be installed for operation in transition modes, substantially as explained with reference to the embodiment of FIG. 3.

A passage 35 through the material of the rotating module 4 is advantageously arranged for balancing the pressures in the gas bearing circuits on either upstream and downstream sides of the rotating module 4, whereby these circuits are connected, over labyrinth seals 29, to the suction pressure PS generated by the impeller 5.

Figure 6:
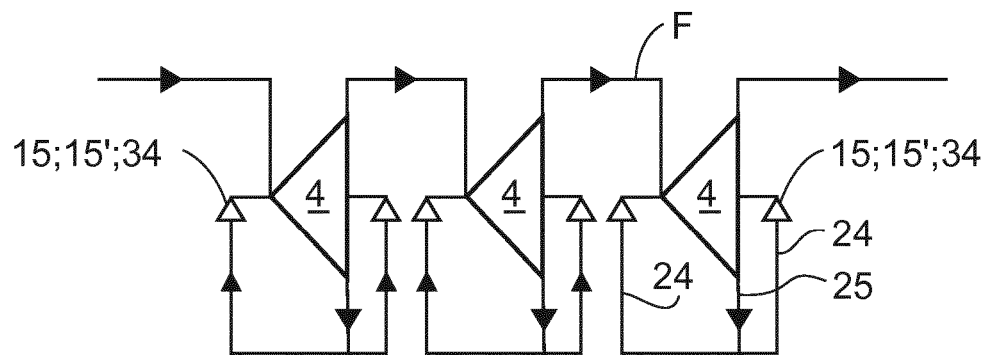
FIGS. 6 and 7 are diagrams showing alternative pathways for gas to be supplied to gas bearings in the modular, stackable compressor.
Figure 7:
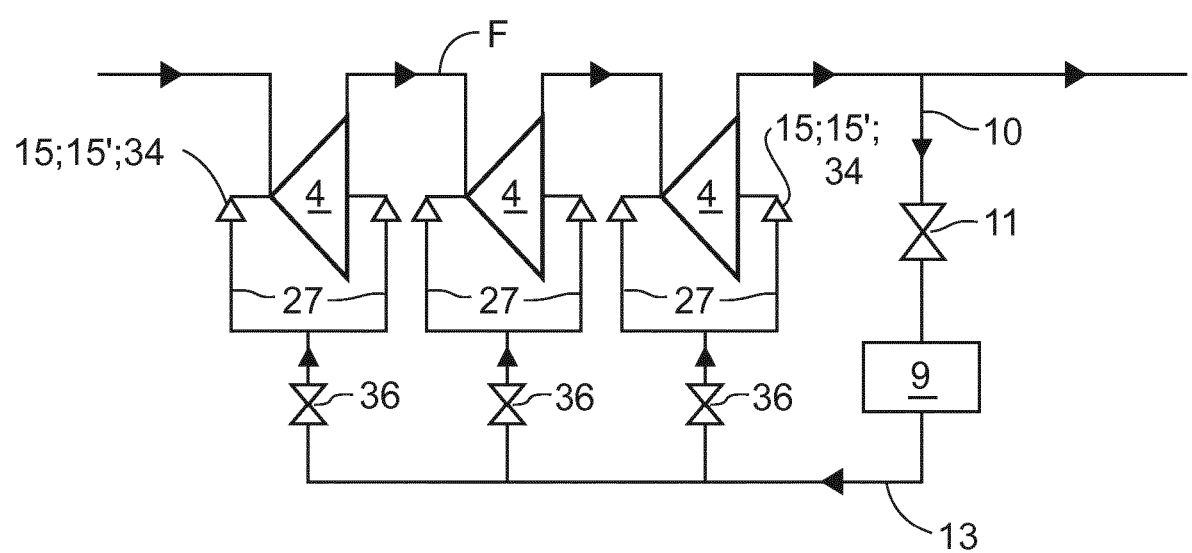

The principle circuits which feed production gas to gas bearings of the modular, stackable compressor is illustrated diagrammatically in FIGS. 6 and 7. FIG. 6 shows extraction of gas from the production gas flow F in the flow duct 7 in order to feed, via gas supply lines 24, the gas bearings 15, 15' or 34 in which the rotors 4 are journaled.

FIG. 7 shows the extraction of production gas from the compressor discharge 3 to feed gas bearings 15, 15' or 34 via the tank 9 and control valves 36, the valves being controllable to set a proper pressure differential between the pressure in the gas supplied to the gas bearings and the pressure of the production gas in the compressor.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A modular compressor for raising the pressure in production gas, comprising:
   a plurality of compressor modules arranged in a stacked configuration, each module of the plurality of compressor modules comprising a rotor module and a stationary module in combination;
   a diffuser section; and
   an internal gas tap located in the diffuser section,
   wherein the rotor module carries an impeller driven in rotation adjacent to the stationary module, and the compressor module accelerates a production gas through a flow duct that passes an interface between the rotor module and the stationary module,
   wherein at the interface at least one gas bearing for taking up axial and/or radial load is provided for journaling the rotor module on the stationary module, and
   wherein a gas feed passage is arranged in the stationary module to lead production gas, extracted from the diffuser at raised pressure, from the internal gas tap directly to the at least one gas bearing.

2. The compressor of claim 1, wherein a gas feed passage is arranged through a stationary vane in the stationary module.

3. The compressor of claim 1, further comprising a production gas tap line connected to the compressor discharge and arranged with a valve for extraction of production gas which is supplied to at least one of the at least one gas bearing via an accumulator and/or a separator.

4. The compressor of claim 3, wherein the at least one gas bearing comprises multiple gas bearings that receive a supply of the production gas from the accumulator/separator from a manifold pipe in fluid commination with the accumulator/separator.

5. The compressor of claim 1, wherein a feed gas passes through the at least one of the at least one gas bearing into an interface between rotating parts of the rotor module and the stationary module, and wherein the interface is isolated from the production gas duct and outer environment by means of labyrinth seals.

6. The compressor of claim 1, wherein between the stationary module and the rotor module there is arranged a thrust bearing which is not a gas bearing.

7. The compressor of claim 6, wherein the thrust bearing is a contact bearing.

8. The compressor of claim 7, wherein the contact bearing comprises polycrystalline diamond pads.

9. The compressor of claim 7, further comprising a passage in the stationary module for supply of lubricant and/or cooling fluid to the contact bearing via a hollow, shaft-less center of the compressor.

10. The compressor of claim 1, wherein the rotor module comprises a ring motor including a permanent magnet rotor and an electromagnet stator.

11. The compressor of claim 10, wherein the permanent magnet is supported on the rotor module whereas the electromagnet stator comprises a magnet that is secured between the stationary module and an adjacent stationary module of an adjacently stacked compressor module of the plurality of compressor modules, in concentric relation with the permanent magnet rotor.

12. The compressor of claim 10, wherein every other rotor module in the set of compressor modules is driven in the opposite direction of rotation relative to the adjacent one.

13. The compressor of claim 10, wherein each rotor module is individually controlled via a separate variable speed drive.

14. A system for raising the pressure in production gas comprising the modular compressor of claim 1.

15. The system of claim 14, comprising:
   a gas tap line connected to a discharge of the compressor;
   an accumulator and/or separator arranged to receive production gas extracted from the discharge via the gas tap line; and
   a manifold arranged to supply production gas from the accumulator/separator to the at least one gas bearing of the stationary compressor module.

16. The system of claim 15, wherein a distributor pipe is located in a shaft-less, hollow center of the modular compressor.

17. A modular compressor for raising the pressure in production gas, comprising:
   a plurality of compressor modules arranged in a stacked configuration, each module of the plurality of compressor modules comprising a rotor module and a stationary module in combination; and
   an external infeed port on an exterior of the stationary module,
   wherein the rotor module carries an impeller driven in rotation adjacent to the stationary module, and the compressor module accelerates a production gas through a flow duct that passes an interface between the rotor module and the stationary module,
   wherein at the interface at least one gas bearing for taking up axial and/or radial load is provided for journaling the rotor module on the stationary module, and
   wherein a gas feed passage is arranged in the stationary module to directly lead production gas, extracted from the compressor at raised pressure, from the external infeed port to the least one gas bearing.

18. The compressor of claim 17, further comprising:
   a diffuser section;
   an internal gas tap located in the diffuser section; and
   an internal feed port in a hollow center of the modular compressor,
   wherein the at least one gas bearing comprises multiple gas bearings, and an amount of the production gas is fed respectively from the internal feed tap and the internal feed port via corresponding passages to at least one respective gas bearing of the multiple gas bearings.

19. A system for raising the pressure in production gas comprising the modular compressor according to claim 17.

* * * * *